(12) United States Patent
Yashiro

(10) Patent No.: US 8,482,812 B2
(45) Date of Patent: Jul. 9, 2013

(54) IMAGE PROCESSING APPARATUS FOR DETECTING OBJECT FROM IMAGE AND METHOD THEREOF

(75) Inventor: Satoshi Yashiro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 457 days.

(21) Appl. No.: 12/603,458

(22) Filed: Oct. 21, 2009

(65) Prior Publication Data
US 2010/0103476 A1 Apr. 29, 2010

(30) Foreign Application Priority Data
Oct. 24, 2008 (JP) .................. 2008-274662

(51) Int. Cl.
- H04N 1/46 (2006.01)
- H04N 1/387 (2006.01)
- H04N 1/38 (2006.01)
- H04N 1/04 (2006.01)
- G06K 9/00 (2006.01)
- G06K 9/46 (2006.01)

(52) U.S. Cl.
USPC ........... 358/464; 358/537; 358/538; 358/452; 358/453; 358/463; 358/474

(58) Field of Classification Search
None
See application file for complete search history.

(56) References Cited

U.S. PATENT DOCUMENTS

| | | | |
|---|---|---|---|
| 2005/0244059 A1* | 11/2005 | Turski | 382/218 |
| 2005/0265605 A1* | 12/2005 | Nakamoto et al. | 382/209 |
| 2007/0188828 A1* | 8/2007 | Suzuki et al. | 358/474 |

FOREIGN PATENT DOCUMENTS

| | | |
|---|---|---|
| JP | 2001-229378 A | 8/2001 |
| JP | 2003-271329 A | 9/2003 |
| JP | 2004-157970 A | 6/2004 |
| JP | 2008-020951 A | 1/2008 |

OTHER PUBLICATIONS

Paul Viola, et al., "Rapid Object Detection using a Boosted Cascade of Simple Features", pp. 1-9, Accepted Conference on Computer Vision and Pattern Recognition 2001.

* cited by examiner

Primary Examiner — Benny Q Tieu
Assistant Examiner — Haris Sabah
(74) Attorney, Agent, or Firm — Canon U.S.A., Inc. IP Division

(57) ABSTRACT

An image processing apparatus includes a first storage unit configured to store image data in order of the image data scanned in a main scanning direction, in a first storage device, a transmission unit configured to transmit pixel information of a partial region longer in the main scanning direction of the image data, from the first storage device to a second storage device, and an object discrimination unit configured to reference the pixel information stored in the second storage device and discriminate whether the partial region is an object region based on the pixel information. Thus, according to image processing apparatus, an object can be rapidly detected.

10 Claims, 16 Drawing Sheets

FIG.10

**STANDARD PATTERN (20*20)**

```
1 2 3 ···           20

···

381 382 ···         400
```

**1/2 REDUCED PATTERN (10*10)**

```
401  ···  410
411  ···  420
     ···
491  ···  500
```

**1/4 REDUCED PATTERN (5*5)**

```
501
 ···
     525
```

FIG.14
1401
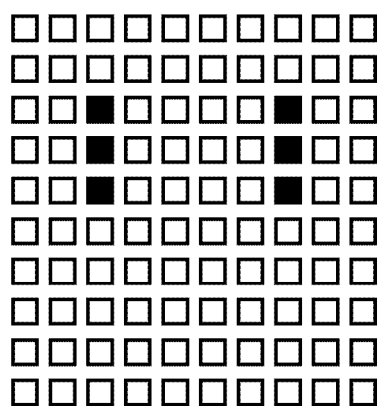
1402
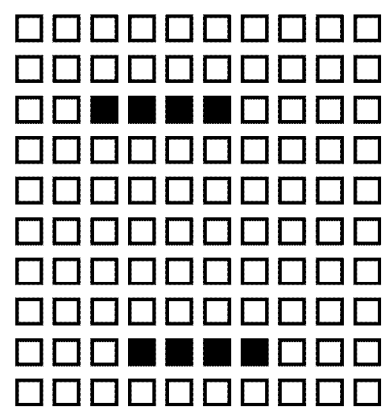

IMAGE PROCESSING APPARATUS FOR DETECTING OBJECT FROM IMAGE AND METHOD THEREOF

BACKGROUND OF THE INVENTION

1. Field of the Invention

The present invention relates to an image processing apparatus configured to detect an object from an image and a method thereof.

2. Description of the Related Art

Image processing methods for automatically detecting a certain object pattern from an image is very useful, for example, in determining a human face. Such image processing methods can be used for various applications including communication conference, man-machine interface, security, monitor/system for tracing a human face, and image compression. A technique for detecting an object from an image is discussed in "Rapid Object Detection using Boosted Cascade of Simple Features" of Proceedings of the IEEE Conference on Computer Vision and Pattern Recognition (CVPR '01).

The above-described document discusses improvement of discrimination accuracy by effectively combining many weak discriminators using AdaBoost. Further, the weak discriminators are connected in series so as to form a cascade detector. Each of the weak discriminators uses a Haar-type rectangle feature quantity in the discrimination. By using an integrated image, each of the weak discriminators can calculate the rectangle feature quantity at a high speed.

The cascade detector removes a pattern that is apparently not an object by using a simple discriminator (i.e., discriminator for a small amount of calculation) arranged at an early stage of the detection. After then, the cascade detector determines whether the remaining patterns are objects by using a discriminator having higher identification capability (i.e., discriminator capable of a large amount of complex calculations) arranged at a subsequent stage. In this way, since the need for performing complex determination on all candidates is unnecessary, the determination can be performed at a high speed.

Generally, in searching an object which is included in an image taken by a digital camera, a field is scanned with a sub-window (frame) of a certain size, and then two-class discrimination is performed. According to the two-class discrimination, whether a pattern image (i.e., image in the sub-window) is an object is determined. Thus, removing a pattern that is not an object at an early stage is a key to realizing reduced detection time.

In order to speedily narrow down a pattern that may be an object at an early stage, a conventional weak discriminator thoroughly searches a position or a size of a local region in which an amount of calculation that is necessary in narrowing down the pattern is minimum, and combines the obtained results.

However, reading speed and transmission speed of a pattern image or an integral image has been a bottleneck in increasing the processing speed.

SUMMARY OF THE INVENTION

The present invention is directed to realizing high-speed object detection (object determination) by focusing on a reading speed and a transmission speed of a pattern image.

According to an aspect of the present invention, an image processing apparatus includes a first storage unit configured to store image data in order of the image data scanned in a main scanning direction, in a first storage device, a transmission unit configured to transmit pixel information of a partial region longer in the main scanning direction of the image data, from the first storage device to a second storage device, and an object discrimination unit configured to reference the pixel information stored in the second storage device and discriminate whether the partial region is an object region based on the pixel information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates a relation between a multiresolution pattern and a pixel number.

FIG. 14 illustrates pixels that are referenced by all the weak discrimination units of a first object discrimination unit.

DESCRIPTION OF THE EMBODIMENTS

Various exemplary embodiments, features, and aspects of the invention will be described in detail below with reference to the drawings.

Figure 1:
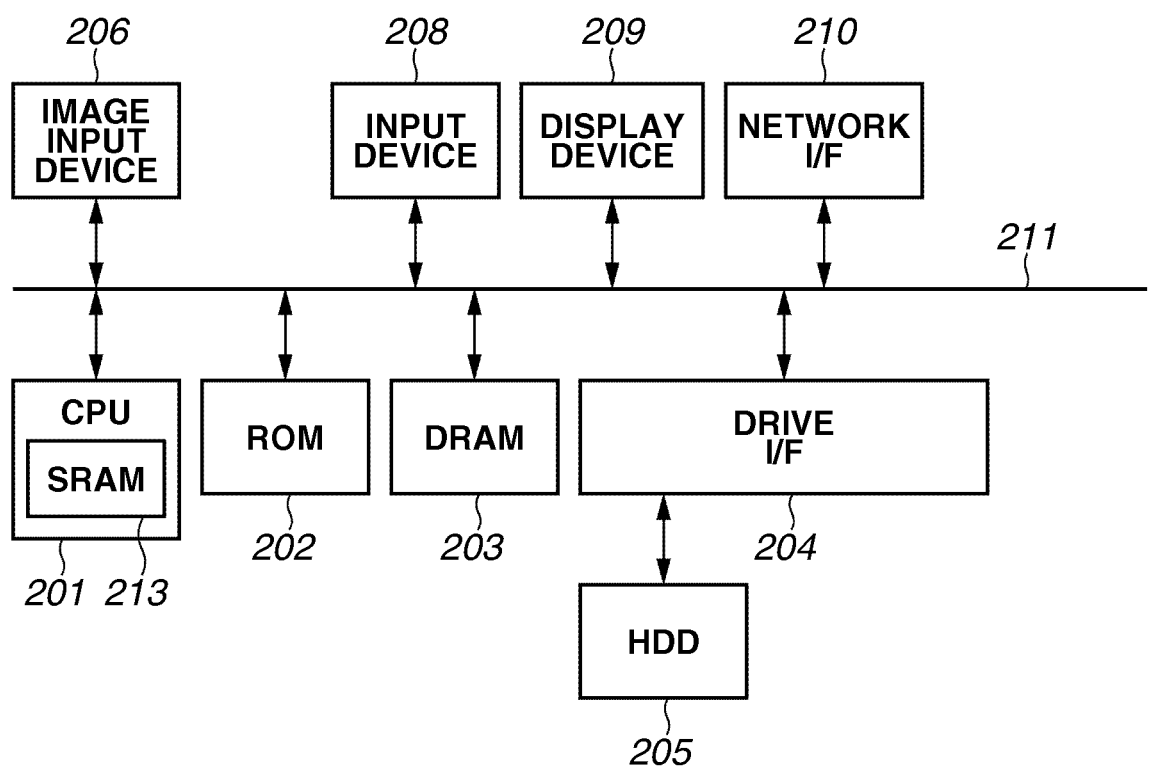
FIG. 1 is an example of a hardware configuration of an image processing apparatus.

FIG. 1 is an example of a hardware configuration of an image processing apparatus.

The image processing apparatus includes a central processing unit (CPU) 201, a read-only memory (ROM) 202, a dynamic random access memory (DRAM) 203, a drive I/F 204, a hard disk drive (HDD) 205, an image input device 206, an input device 208, a display device 209, and a network I/F 210. All of these components are connected via a bus 211. Thus, data is input and output via the bus 211.

The CPU 201 executes commands according to a program stored in the ROM 202 or the DRAM 203. A program according to the present embodiment as well as other control programs or data are stored in the ROM 202. Temporary data is stored in the DRAM 203. The drive I/F 204 is an interface between the image processing apparatus and an external storage unit such as an IDE device or a SCSI device. An image, a pattern extraction program, and a sample face/non-face pattern are stored in the HDD 205.

The image input device 206 inputs an image that is output from an apparatus such as a digital camera or a scanner into the image processing apparatus. The input device 208 is, for example, a keyboard or a mouse. An operator uses this device in entering instructions. The display device 209 is, for example, a cathode-ray tube or a liquid crystal display for the operator. The network I/F 210 is a modem that connects the image processing apparatus and a network such as the Internet, an intranet, or a local area network (LAN).

The CPU 201 includes a static random access memory (SRAM) 213 referred to as a memory cache. The SRAM 213 is capable of inputting/outputting data at a speed higher than a DRAM.

Figure 2:
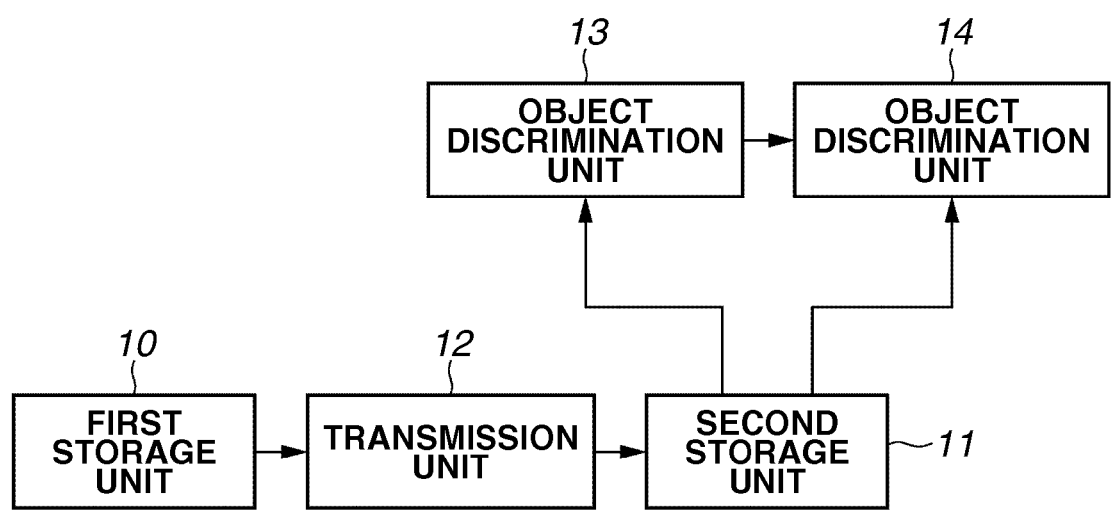
FIG. 2 is an example of a functional configuration of the image processing apparatus.

FIG. 2 is an example of a functional configuration of the image processing apparatus.

A first storage unit 10 stores data of a two-dimensional image in the first storage device being a part of the DRAM 203. The two-dimensional image is formed by a matrix of pixels that are arranged in the main scanning direction and in the sub-scanning direction. The first storage unit 10 reduces the input RGB image and stores only the luminance information in 8-bit-per-pixel format in the first storage device. The information is stored in the first storage device in order of the pixels being scanned in the main scanning direction. The main scanning direction is the horizontal direction and the sub-scanning direction is the vertical direction.

In addition to expansion/reduction processed data and color conversion processed data, edge image data representing strength of an edge in a predetermined direction and a piece or pieces of differential image data or integral image data that is obtained by integral or differential image processing, may also be the image data that is stored in the first storage unit 10.

In a second storage device that is a part of the SRAM 213, a second storage unit 11 stores pixel information of a partial region in a predetermined region of an image stored in the first storage device that is necessary in the discrimination performed by an object discrimination unit 14.

A transmission unit 12 transmits a part of the image data that is stored in the first storage device to the second storage device according to an instruction issued by a control unit (not shown).

Based on the pixel information that is stored in the second storage device, an object discrimination unit 13 and the object discrimination unit 14 determine whether the predetermined region is an object or not. The object discrimination unit 14, which is in a stage subsequent to the object discrimination unit 13, starts operation according to a determination result of the object discrimination unit 13 in the preceding stage.

Although two object discrimination units are serially connected in two stages in the illustration in FIG. 2 for simplified description, more object discrimination units can be serially connected. Further, the object discrimination units can be configured to generate a tree structure so that a discrimination result determined by the discrimination made in the preceding stage can be branched to the object discrimination unit in the subsequent stage depending on the result.

Figure 3:
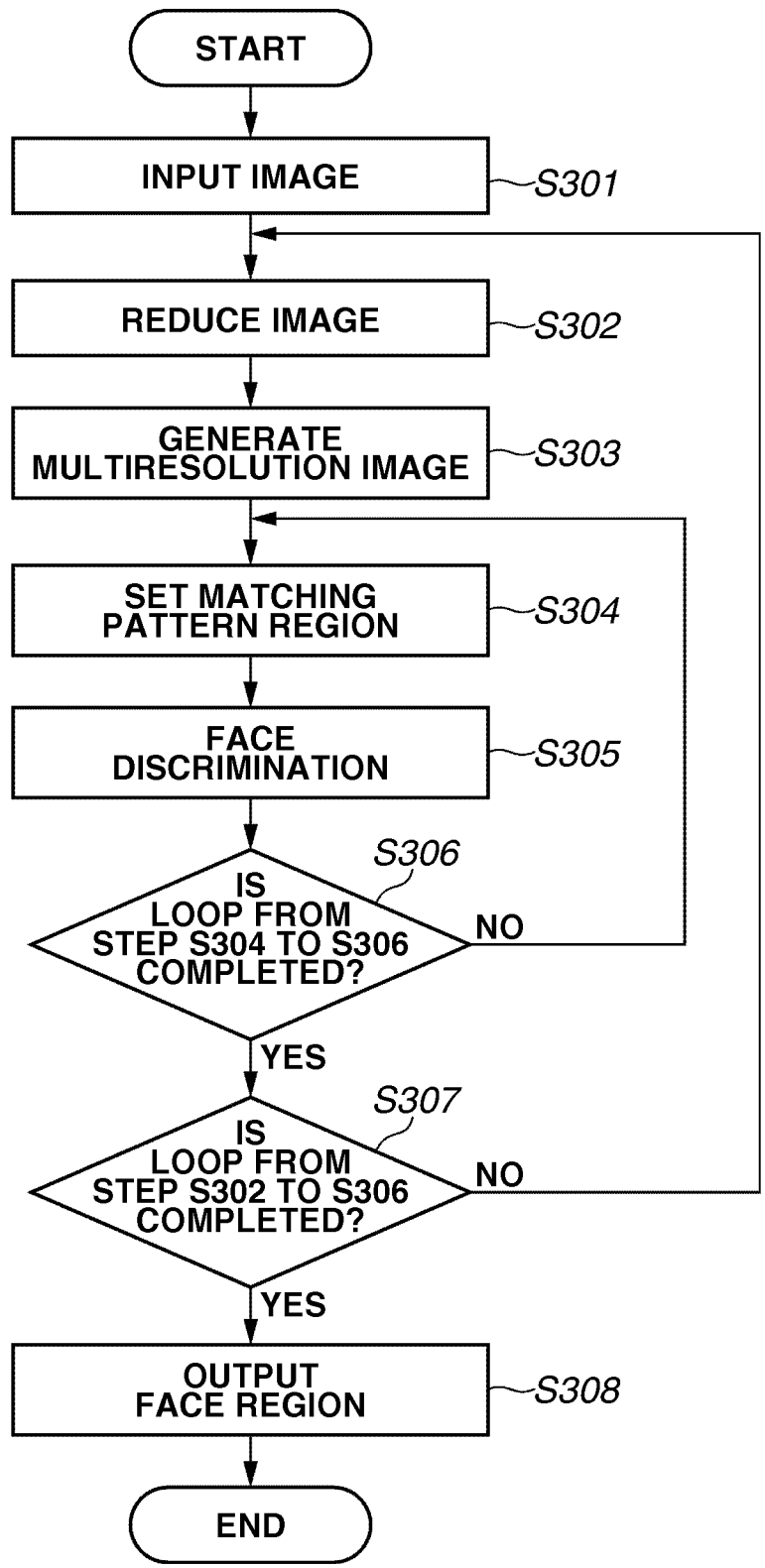
FIG. 3 is a flowchart illustrating flow of processing according to an exemplary embodiment of the present invention.

Next, the flow of the processing of the present embodiment will be described referring to a flowchart in FIG. 3. FIG. 3 is a flowchart illustrating the flow of the processing according to the present embodiment.

In step S301, the first storage unit 10 loads a desired image data from the image input device 206 to the DRAM 203.

The image data that is loaded is, for example, data on two-dimensional arrangement of pixels represented by 8-bit R, G, and B signals. If the image data is compressed by JPEG (joint photographic experts group) compression, the first storage unit 10 decompresses the image data according to a predetermined decompression method, so that RGB pixel data is obtained. Further, according to the present embodiment, the first storage unit 10 converts the RGB data into luminance data and stores the converted luminance data in the DRAM 203. The luminance image data is used in the subsequent processing. If the input data is in YCrCb format, the first storage unit 10 may use the Y component directly as the luminance data.

In step S302, the first storage unit 10 generates luminance image data that is image data reduced to a predetermined size. According to the present embodiment, since detection of various face sizes is performed, a plurality of images of different sizes are sequentially detected. For example, the first storage unit 10 sequentially performs reduction processing of a plurality of images whose magnification is 1.2 times different for the detection processing which is to be performed in the later stage.

In step S303, the first storage unit 10 generates a multiresolution image. A ½- or a ¼-reduced image of an image of a pattern region is rapidly obtained according to this processing.

Figure 4:
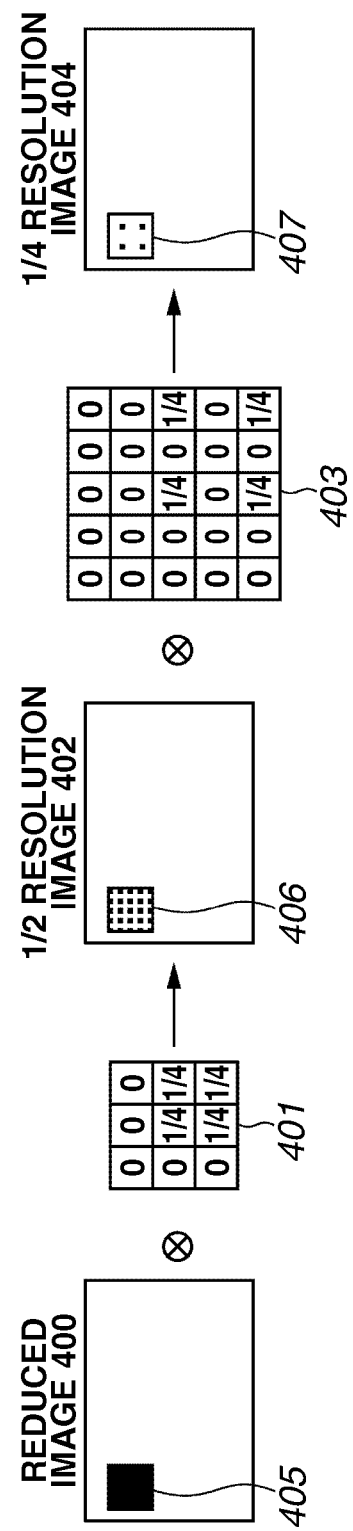
FIG. 4 is an example of generation processing of a multi-resolution image.

The generation processing is illustrated in FIG. 4. FIG. 4 illustrates a generation of the multiresolution image. As illustrated in FIG. 4, the first storage unit 10 generates a ½ resolution image 402 by filtering the entire region of a reduced image 400 by a filter 401 using convolution.

Further, the first storage unit 10 generates a ¼ resolution image 404 by filtering the ½ resolution image 402 by a filter 403 using convolution.

Figure 5:
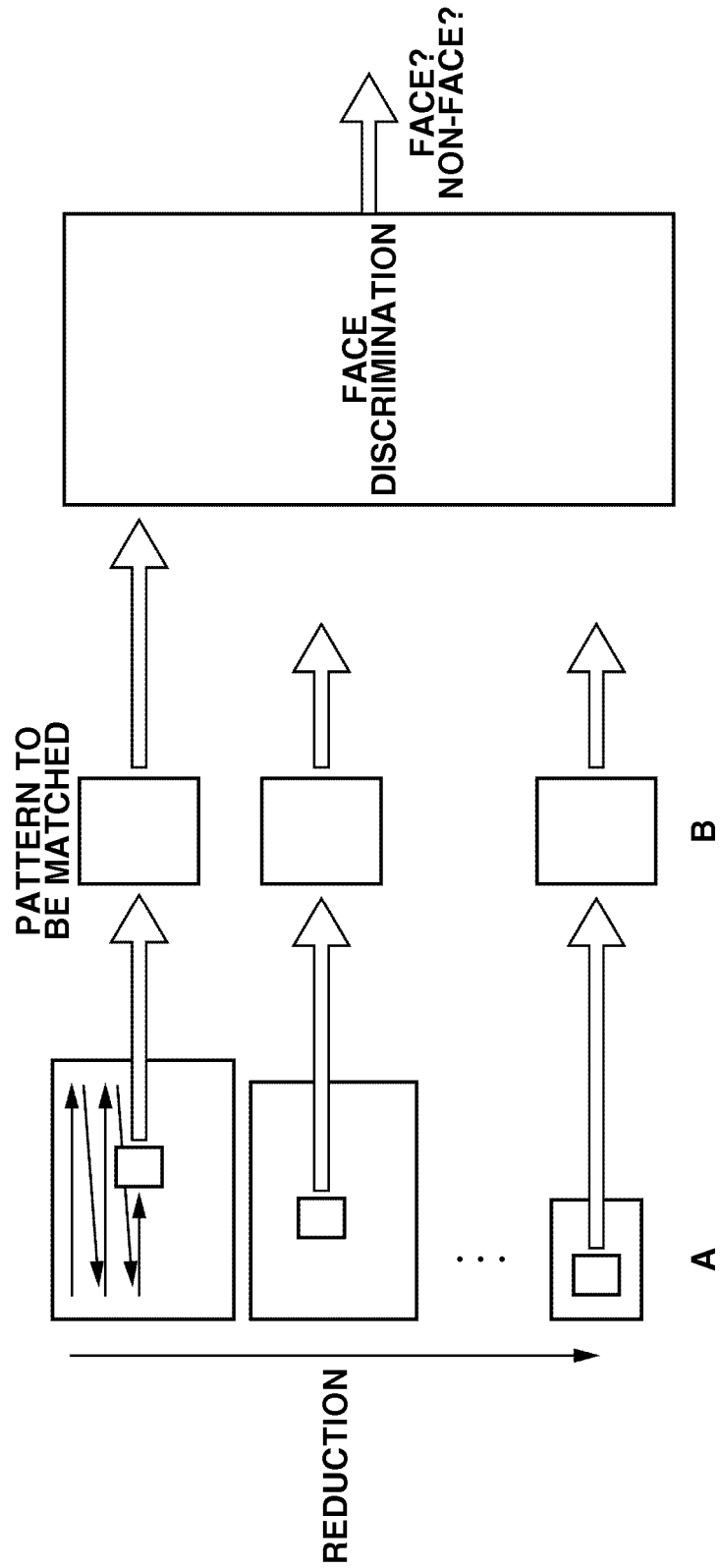
FIG. 5 is an example of partial region setting.

In step S304, the first storage unit 10 sets a partial region of a predetermined size over the reduced luminance image. The setting process is illustrated in FIG. 5. FIG. 5 illustrates setting processing of a partial region.

Images in the row "A" in FIG. 5 are images that are reduced in step S302. The first storage unit 10 defines a rectangular region of a predetermined size from each of the reduced images. Images in the row "B" in FIG. 5 illustrate the setting of the images when the first storage unit 10 repeatedly scans each of the reduced images from right to left and from top to bottom in a sequential manner. In performing the face discrimination, if a matching pattern region (matching pattern) is set from an image that is reduced by a greater reduction ratio, as can be seen from FIG. 5, a face that is large with respect to the image will be detected.

In step S305, for example, the object discrimination units 13 and 14 determine whether the matching pattern is a face pattern or a non-face pattern.

As illustrated in FIG. 5, scanning of the reduced luminance image being an output of step S302 is repeated horizontally/vertically in a sequential manner in the processing from steps S304 to S306. If the processing of steps S304 to S306 is not completed in step S306 (NO in step S306), then the process returns to step S304. If the processing of steps S304 to S306 is completed in step S306 (YES in step S306), then the process proceeds to step S307. Further, reduction processing of a different magnification will be sequentially applied and processing from steps S302 to S306 will be repeated.

In step S307, the control unit determines whether the processing of steps S302 to S306 is completed. If the processing is not completed (NO in step S307), then the process returns to step S302. If the processing is completed (YES in step S307), the process proceeds to step S308. In step S308, a pattern that is determined as a face is output to the display device 209 as a face region.

Figure 6:
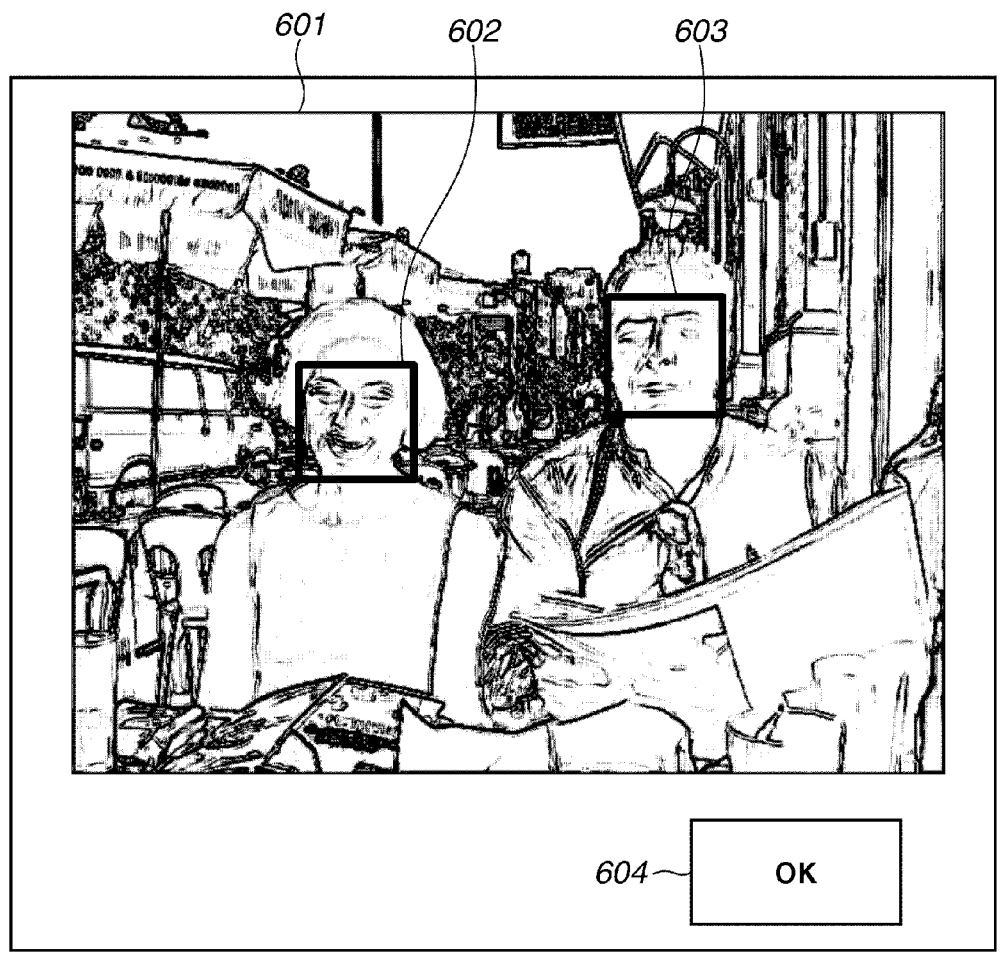
FIG. 6 is an example of a display screen of a display device.

FIG. 6 is an example of a screen displayed on the display device 209. A detection result of a face is superposed on an input image 601 and output on the screen. Frames 602 and 603 indicate the positions and the sizes of the face patterns that are extracted by the object discrimination unit. Further, a button 604 is an OK button of the object discrimination processing.

Next, the face discrimination processing performed in step S305 will be described in detail.

The face discrimination is realized by a plurality of object discrimination units which are connected in series as illustrated in FIG. 2. The object discrimination unit 13 in the preceding stage determines whether the pattern data (matching pattern) that is input is an object (face pattern). Only when the pattern data is determined as an object, the object discrimination unit 14 in the subsequent stage determines again whether the pattern data is an object at accuracy higher than the determination performed in the preceding stage. Each of the plurality of object discrimination units has a similar configuration. Additionally, each of the weak discrimination units included in the object discrimination units has a similar configuration. Only the number of the weak discrimination units in the object discrimination units and the discrimination parameters are different.

Figure 7:
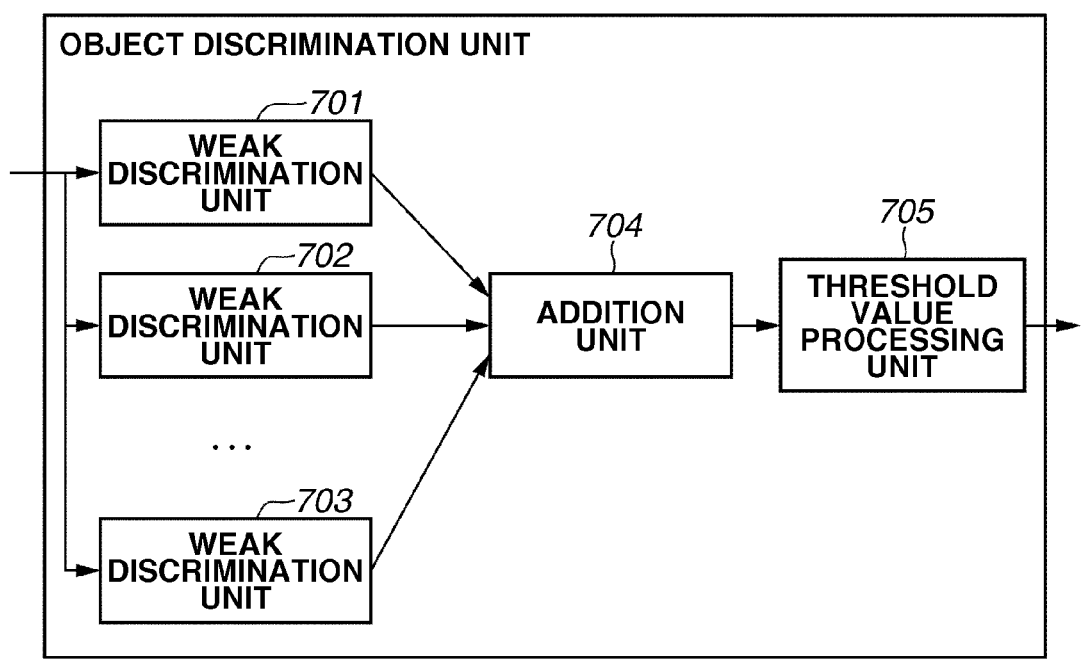
FIG. 7 is an example of an object discrimination unit.

Next, the object discrimination unit will be described in detail. FIG. 7 illustrates the details of the object discrimination unit. Each object discrimination unit includes a plurality of weak discrimination units 701 to 703. Object likelihood that is output from each of the weak discrimination units 701 to 703 is added by an addition unit 704. Then the result is sent to a threshold value processing unit 705 where threshold value (threshold value determination) processing is performed. According to the result of the threshold value determination, the pattern data is determined whether it is an object.

Figure 8:
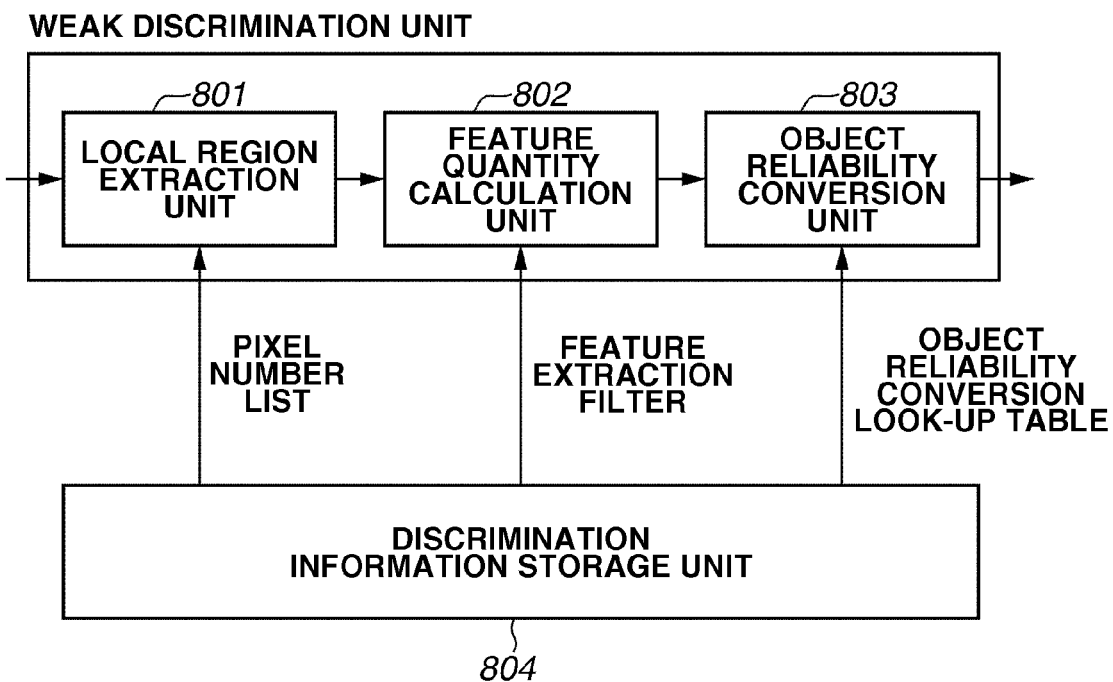
FIG. 8 is an example of a weak discrimination unit.

Next, the configuration of the weak discrimination unit will be described. FIG. 8 is an example of the weak discrimination unit. The weak discrimination unit includes a local region extraction unit 801, a feature quantity calculation unit 802, and an object reliability conversion unit 803. A discrimination parameter is supplied to each of the units 801 to 803 from a discrimination information storage unit 804.

Figure 9:
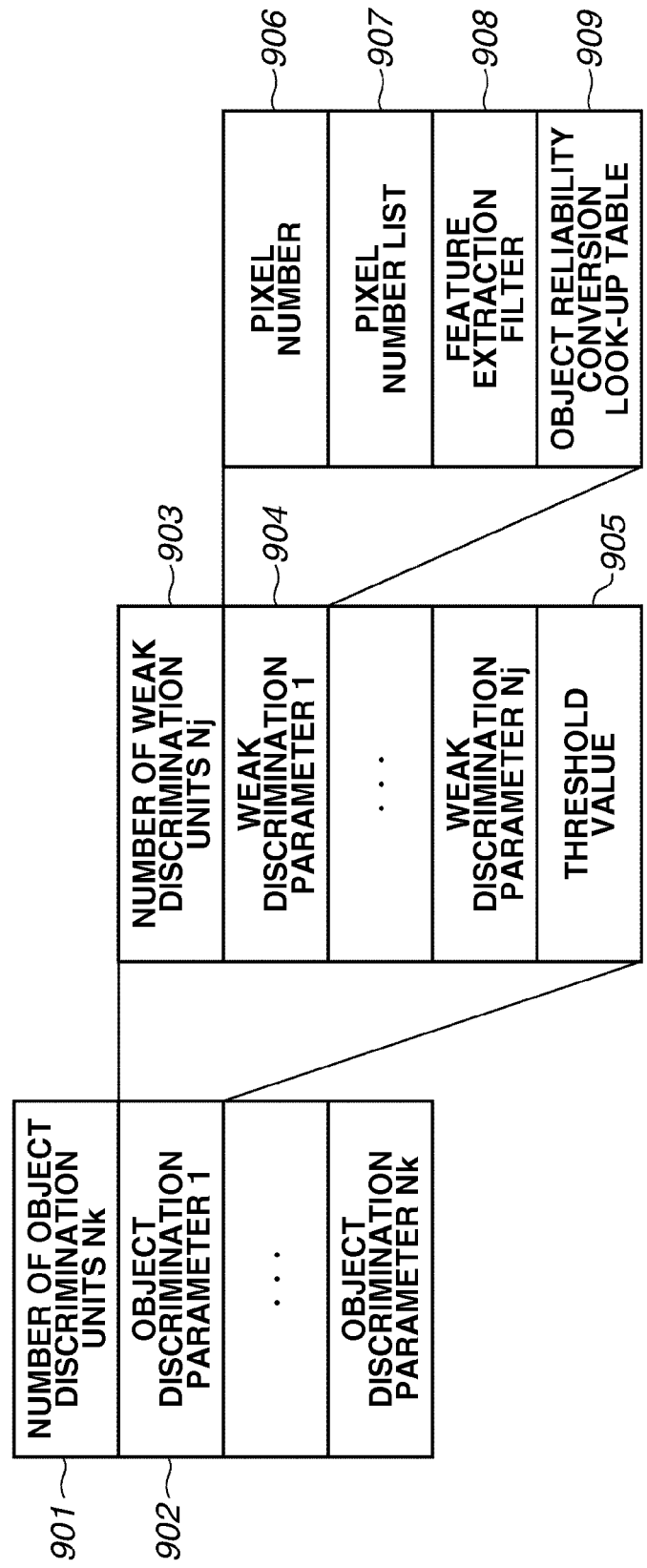
FIG. 9 is an example of a discrimination parameter.

Next, the discrimination parameter that is stored in the discrimination information storage unit 804 will be described. FIG. 9 is an example of the discrimination parameter.

The discrimination parameter includes an object discrimination unit number 901 and object discrimination parameters 902. The number of the object discrimination parameters 902 corresponds to the number of the object discrimination unit number 901. Each of the object discrimination parameters 902 includes parameters concerning one object discrimination unit. Each of the object discrimination parameters 902 includes a weak discrimination unit number 903, weak discrimination parameters 904, and a threshold value 1005. The number of the weak discrimination parameters 904 corresponds to the number of the weak discrimination unit number 903.

Each of the weak discrimination parameters 904 includes parameters concerning one weak discrimination unit. Each of the weak discrimination parameters 904 includes a pixel number 906 of each local region, a pixel number list 907 including a pixel number in a local region, and a feature extraction filter 908. The number of lines of the feature extraction filter 908 corresponds to the pixel number 906 and the number of columns is 1. Additionally, each of the weak discrimination parameters 904 includes an object reliability conversion look-up table 909 which is a table concerning conversion from feature quantity into object reliability.

According to the present embodiment, a face pattern is a 20×20 pixel pattern that includes an eye and a mouth, as illustrated in FIG. 10. Further, a 10×10 pixel pattern is formed by reducing this pattern to ½, and a 5 pixel×5 pixel pattern is formed by reducing the pattern to ¼. Then, pixel numbers from 1 to 525 are assigned to all the pixels, respectively. The multiresolution images formed by the image processing apparatus bring about two advantages. If the resolution is low, positional relation of the parts of a face can be effectively determined. On the other hand, if the resolution is high, partial features of a face can be accurately matched.

Figure 11:
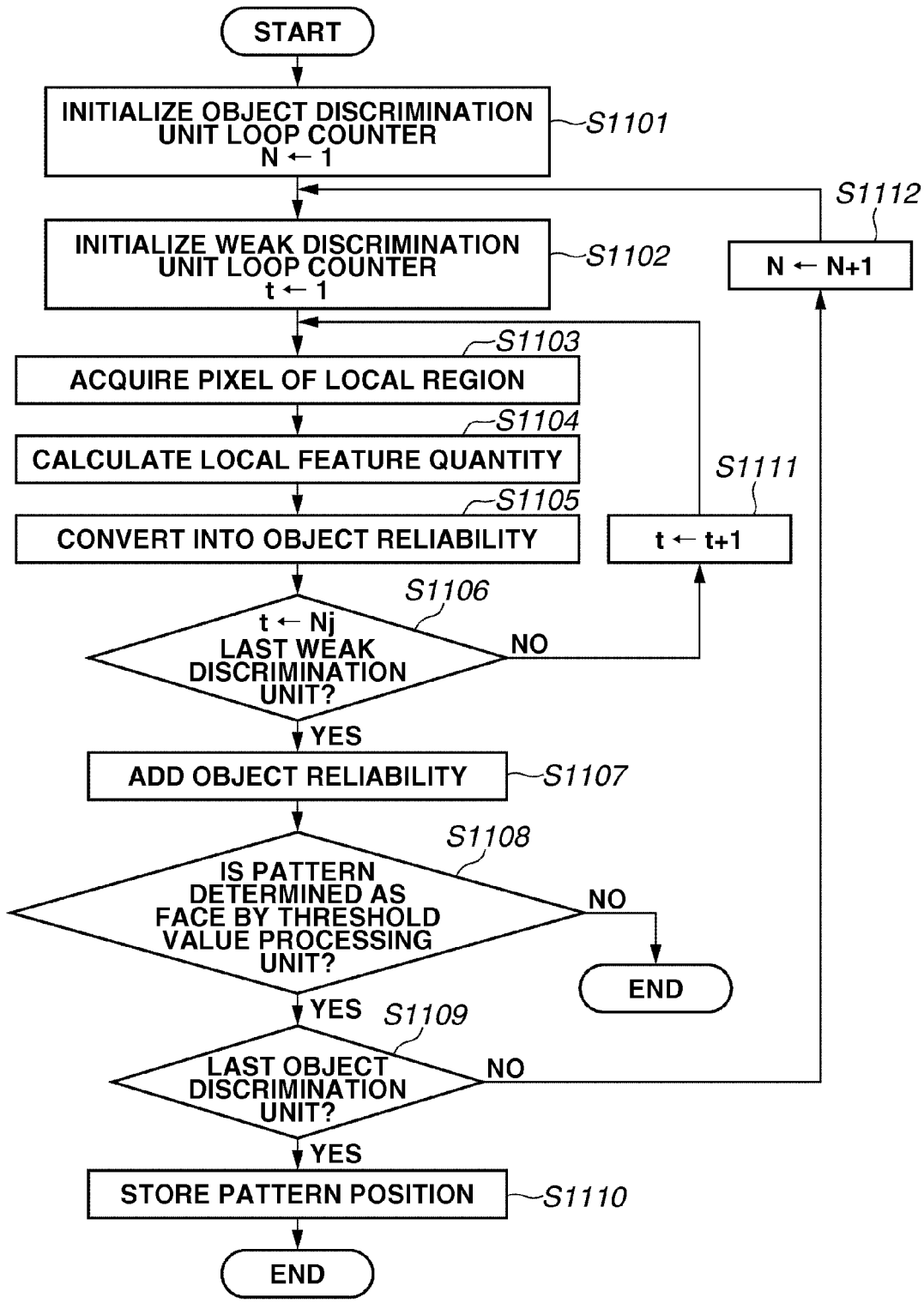
FIG. 11 is a flowchart illustrating face discrimination processing.

Next, the flow of the face discrimination processing will be described in detail referring to FIG. 11. FIG. 11 is a flowchart illustrating an example of the face discrimination processing.

In step S1101, the object discrimination unit initializes an object discrimination unit loop counter N.

In step S1102, the weak discrimination unit initializes a weak discrimination unit loop counter t.

In step S1103, the weak discrimination unit issues a request to the transmission unit 12 so that a reference pixel in the pattern is transmitted from the DRAM 203 to the SRAM 213 according to the pixel number list 907. Based on this request, the transmission unit 12 transmits the reference pixel in the pattern from the DRAM 203 to the SRAM 213.

The reading method of the pixels of a reduced pattern will be described referring to FIG. 4. In FIG. 4, an 8×8 pixel pattern is used so as to simplify the description. The ½ resolution image 402 and the ¼ resolution image 404 have a same horizontal and vertical size as the reduced image 400. If a pixel in an 8×8 pixel pattern region 405 is referred from the reduced image 400, then a ½-resolution 4×4 pixel pattern image 406 will be equal to a pattern whose pixel is arranged every two pixels from the same region as presented by black spots in the ½ resolution image 402. Similarly, a ¼-resolution 2×2 pixel pattern image 407 will be equal to a pattern whose pixel is arranged every four pixels from the same region in the ¼ resolution image 404.

In step S1104, the feature quantity calculation unit 802 calculates a local feature quantity Ut according to the following equation (1).

$$U_{t,N} = \phi_{t,N} T z_{t,N} \tag{1}$$

The subscripts t,N denote the t-th weak discrimination unit of the N-th object discrimination unit. $U_{t,N}$ denotes a numerical value indicating local feature quantity of the t-th weak discrimination unit of the N-th object. $\phi_{t,N}$ denotes the feature extraction filter 908 of the t-th weak discrimination unit of the N-th object. $z_{t,N}$ denotes a number of lines corresponding to a number of luminance pixels of a pattern or a reduced pattern (i.e., a matrix of one column) that is included in the pixel number list 907 obtained by the local region extraction unit 801, and of the t-th weak discrimination unit of the N-th object.

In step S1105, the object reliability conversion unit 803 converts the local feature quantity $U_{t,N}$ into object reliability $H_{t,N}$ according to the following equation (2).

$$H_{t,N} = f_{t,N}(U_{t,N}) \tag{2}$$

A function $f_{t,N}$ denotes an output of the weak discrimination unit where the local feature quantity $U_{t,N}$ is converted into the object reliability $H_{t,N}$ according to the object reliability conversion look-up table 909.

If the local feature quantity $U_{t,N}$ is above the upper limit or falls below the lower limit, the object reliability conversion unit 803 sets the local feature quantity to the upper limit or the lower limit, and then obtains the object reliability referring to the table.

In step S1106, the object determination unit repeats the processing in step S1104 to 1106 by incrementing the weak discrimination unit number t by 1 in step S1111 until the last weak discrimination unit performs the processing. Thus, if the process of the last weak discrimination unit is not started (NO in step S1106), the process proceeds to step S1111.

If the process of the last weak discrimination unit is completed and the object reliability is obtained (YES in step S1106), then the process proceeds to step S1107. In step S1107, the addition unit 704 obtains a sum of the object reliability according to the following equation (3).

$$H = \Sigma t H_{t,N} \quad (3)$$

In step S1108, the threshold value processing unit 705 determines whether the pattern is an object by comparing the sum obtained in step S1107 and the threshold value according to the following equation (4).

$$H \geq Th_N \quad (4)$$

If the threshold value processing unit 705 determines that the pattern is not a face (NO in step S1108), the process ends.

On the other hand, if the threshold value processing unit 705 determines that the pattern is a face (YES in step S1108), then the process proceeds to step S1109. If the determination by the last object discrimination unit is still not completed (NO in step S1109), then the process proceeds to step S1112. In step S1112, the object discrimination unit number N is incremented by 1. Then the process returns to step S1102 and the processes from steps 1102 to 1109 are repeated until the last object discrimination unit makes a determination in step S1109.

Only when all object discrimination units up to the last unit have determined that the pattern is a face (YES in step S1109), it is ultimately determined that it is a face. Then the process proceeds to step S1110. In step S1110, the position of the pattern is stored, and then the process ends.

According to the present embodiment, linear identification feature of a local region having a predetermined resolution, a predetermined size, or a predetermined shape among the matching patterns is used as a local feature quantity.

Figure 12:
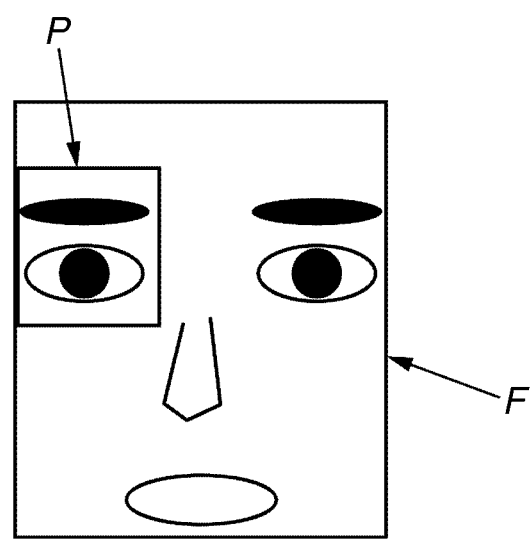
FIG. 12 is an example of a local region of a face.

As illustrated in FIG. 12, if a 20×20 pixel luminance pattern is a matching pattern F, a square 5×5 pixel local region being a part of the matching pattern F will be a local region P. In this case, if the local region P is set to all the pixel positions in the matching pattern F, then a total of 256 local regions are generated.

Figure 13:
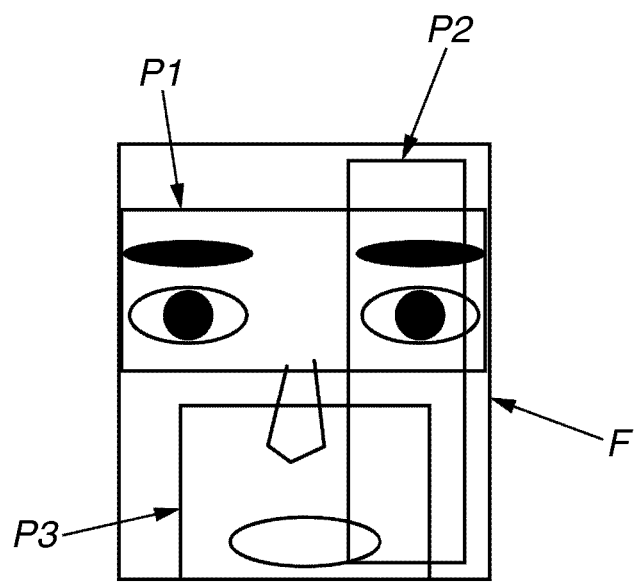
FIG. 13 is an example of another local region of the face.

In addition to the square local regions, the image processing apparatus can also use a combination of local regions having various shapes and sizes such as a horizontally-long rectangle, a vertically-long rectangle, and an ellipse. Examples of such local regions are illustrated as local regions P1, P2, and P3 in FIG. 13. Further, the image processing apparatus can reduce the original matching pattern, generate various low-resolution matching patterns, and use a combination of the local regions of the matching patterns having various resolutions. Further, the image processing apparatus can use a plurality of dispersed areas/pixels.

Memory transmission cost can be greatly reduced by using a pixel in a local region which is referenced more frequently by the object discrimination unit in the earlier stage than in the later stage.

For example, the pixels referenced by the object discrimination unit 13 in the earlier stage are taken from a horizontally-long partial region. In other words, for example, the transmission unit 12 transmits information of pixels (pixel information) of a partial region that is long in the main scanning direction from the DRAM 203 to the SRAM 213 so that the object discrimination unit 13 in the preceding stage can reference the information. Then, the object discrimination unit 13 references the pixel information and executes processing concerning the above-described discrimination.

In this way, since the object discrimination unit 13 can reference the contiguous pixels in the main scanning direction, it can utilize a bit width that can be transmitted by the bus at a time, at a maximum.

FIG. 14 illustrates pixels that are referenced by all of the weak discrimination units of the first object discrimination unit. A pattern 1401 is a pattern of 10×10 resolution black pixels and references 6 pixels that represent, for example, both eyes of a face. On the other hand, pixels of a pattern 1402 that are referenced by all of the weak discrimination units of an object discrimination unit having the same discrimination performance are taken from a horizontally-long local region. Since the number of pixels of the pattern 1402 is greater, its calculation cost is greater than that of the pattern 1401. However, since the local region of the pattern 1402 is long in the horizontal direction, the transmission cost of the pattern 1402 is smaller than that of the pattern 1401, and consequently, the pattern 1402 can be discriminated more speedily.

Further, the reference pixels can be arranged such that the number of pixels when they are projected in the main scanning direction is smaller than half the number of pixels in a predetermined region in the sub-scanning direction. For example, only even-numbered pixels in the vertical coordinate direction are used as reference pixels.

Figure 15:
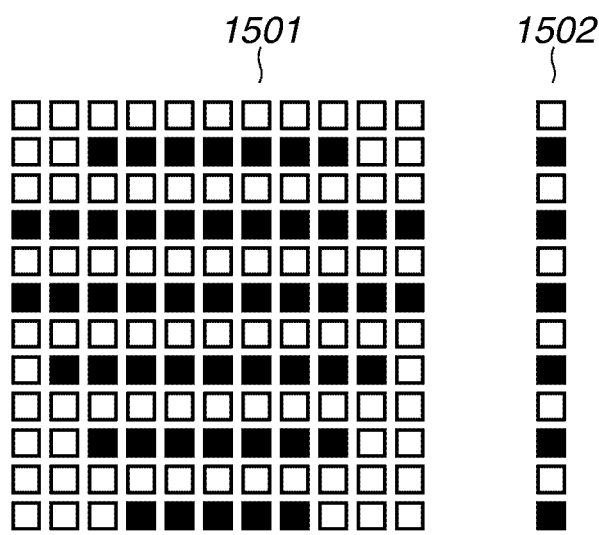
FIG. 15 illustrates a local region referenced by an object discrimination unit in an earlier stage.

FIG. 15 illustrates an example of the local region referenced by the object discrimination unit on the preceding side. A pattern 1501 illustrates pixels of a pattern in black which all weak discrimination units of an object discrimination unit references. A pattern 1502 is the pattern 1501 projected in the main scanning direction. If a black pixel exists in a corresponding line, the pixel will be black in the pattern 1502. If not, that pixel will be white. The smaller the number of the black pixels among the projected pixels, the smaller the transmission cost of the pattern will be.

Regarding data input/output to and from the DRAM 203 according to the above-described processing, since contiguous data can be read out at a time by using burst transmission, it is possible to reduce the number of times of the burst transmission if the matching pattern is transmitted by burst transmission for each single line.

Further, the transmission cost of the pixel data of the matching pattern stored in the SRAM 213 can be reduced by continuously holding the data that is once transmitted during the loops of step S1106, and steps S1106 and 5306 depending on memory size. If the matching pattern region is shifted one pixel in the horizontal direction, and determination (discrimination) is made, since most areas in the pattern region overlap with each other, the data can be used again. Thus, a band buffer that is long in the main scanning direction of the image can be used.

Further, the resolution of the matching pattern that is referenced can be limited. For example, it is effective to use only a pattern that is reduced from 20×20 pixel to 10×10 pixel in the determination. Although the reference pixels in the ½ resolution image are not contiguous, the transmission cost can be reduced by skipping one pixel and using every other pixel in the vertical direction (i.e., the sub-scanning direction). Further, by not skipping one pixel but transmitting contiguous pixels in the horizontal direction (i.e., the main scanning direction), when a pattern region is one pixel shifted in the horizontal direction, the data can be used without newly transmitting again.

The present embodiment is also applicable when the feature quantity is obtained by combining the rectangle regions as described in the aforementioned document. According to the aforementioned document, a sum of the pixels in the rectangle regions can be quickly obtained by using integral images. More specifically, the sum of the pixels in the rectangle regions can be obtained by referencing an integral image regarding four pixels that correspond to the vertexes of the rectangle, and by add/subtract calculation of the integration values of the four points. In this case, since only four points for each rectangle is necessary in the memory transmission, these points correspond to the above-described reference pixels.

In the setting of the matching pattern area in step S304, the entire image is not necessarily scanned.

For example, if the matching pattern area is a face, only the regions that include a skin color can be searched. Further, by removing an image region that has little luminance difference between adjacent pixels such as a wall, the matching pattern area can be set more quickly. Furthermore, if these methods are applied to a moving image, since images that are close in terms of time, show a strong correlation, by using position information of an object in adjacent images or by limiting the matching pattern area to areas that show any difference from the adjacent image, the matching pattern area can be set more quickly.

When such a speed-enhancement method is used, since the scanning of the pattern region becomes discontinuous, the effect of the present embodiment is furthermore enhanced.

Figure 16:
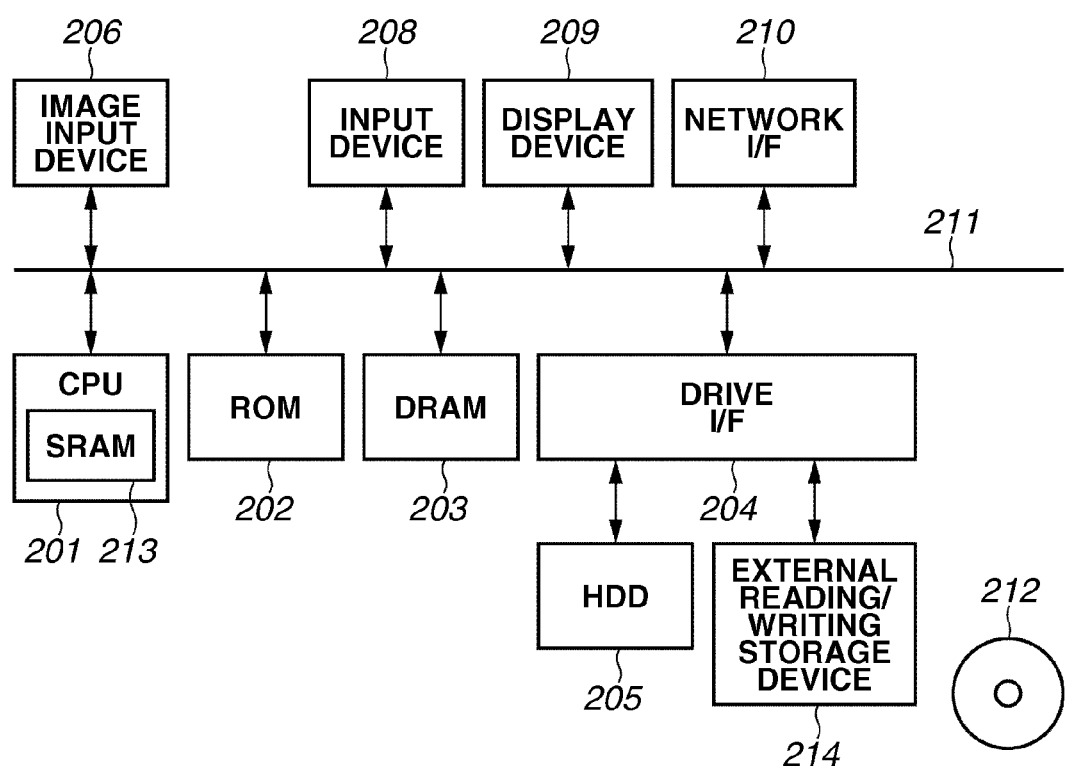
FIG. 16 illustrates an example of another hardware configuration of the image processing apparatus.

FIG. 16 is another example of a hardware configuration of the image processing apparatus. Components similar to those in the first exemplary embodiment are denoted by the same reference numerals.

Its difference from the first exemplary embodiment is that an optical disk 212 such as a digital versatile disc (DVD) or a compact disc (CD) that records a program according to the present embodiment is added, and an external storage reading/writing apparatus 214 such as a CD/DVD drive is connected to the drive I/F 204 in the present embodiment.

If the optical disk 212 that records the program according to the present embodiment is inserted into the external storage reading/writing apparatus 214, the CPU 201 reads the program from the recording medium and loads the content to the DRAM 203. In this way, processing similar to that of the first exemplary embodiment can be realized.

Although face extraction has been used in describing the above-described embodiment, the above-described configuration and processing can be used for arbitrary objects other than a face. For example, the above-described embodiment can be applied to an entire human body, an upper half of human body, an animal, and an automobile. In the fields of industry and distribution, the above-described embodiment can be used in identifying or inspecting a product, a part, or a commercial product in distribution.

According to the above-described exemplary embodiment, high-speed object detection is realized by focusing on a reading speed and a transmission speed of a pattern image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-274662 filed Oct. 24, 2008, which is hereby incorporated by reference herein in its entirety.

What is claimed is:

1. An image processing apparatus comprising:
a first storage unit configured to store image data in order of the image data scanned in a main scanning direction, in a first storage device,
a setting unit configured to sequentially move and set a matching pattern in the image data, wherein a length of the main scanning direction of the matching pattern region is longer than a length of the sub scanning direction of the matching pattern region,
a transmission unit configured to transmit pixel information of the matching pattern region line by line in the main scanning direction, from the first storage device to a second storage device, and
an object discrimination unit configured to reference the pixel information of the matching pattern stored in the second storage device and discriminate whether the matching pattern region is an object region based on the pixel information,
wherein the object discrimination unit includes a first object discrimination unit and a second object discrimination unit, and
wherein the transmission unit transmits the pixel information to be referenced by the first object discrimination unit from the first storage device to the second storage device, and if the matching pattern region is discriminated as an object region by the first object discrimination unit, the pixel information to be referenced by the second object discrimination unit is transmitted from the first storage device to the second storage device.

2. The image processing apparatus according to claim 1, wherein the pixel information is luminance information of the image data.

3. The image processing apparatus according to claim 1, wherein the pixel information includes a piece or pieces of image data obtained by convolution using a predetermined filter, differential image data, or integral image data.

4. An image processing apparatus comprising:
a first storage unit configured to store image data in an order of the image data scanned in a main scanning direction, in a first storage device,
a setting unit configured to sequentially move and set a matching pattern in the image data, wherein a pixel number in a projected line when the image data of the matching pattern region is projected along the main scanning direction, is smaller than half of a pixel number of the matching pattern in the sub scanning direction;
a transmission unit configured to transmit pixel information of the matching pattern region line by line in the main scanning direction, from the first storage device to a second storage device; and
an object discrimination unit configured to reference the pixel information of the matching pattern stored in the second storage device and discriminate whether the matching pattern region is an object region based on the pixel information,
wherein the object discrimination unit includes a first object discrimination unit and a second object discrimination unit, and
wherein the transmission unit transmits the pixel information to be referenced by the first object discrimination unit from the first storage device to the second storage device, and if the matching pattern region is discriminated as an object region by the first object discrimination unit, the pixel information to be referenced by the second object discrimination unit is transmitted from the first storage device to the second storage device.

5. The image processing apparatus according to claim 4, wherein the pixel information is luminance information of the image data.

6. The image processing apparatus according to claim 4, wherein the pixel information includes a piece or pieces of image data obtained by convolution using a predetermined filter, differential image data, or integral image data.

7. An image processing method for an image processing apparatus, the method comprising:
    storing image data in order of the image data scanned in a main scanning direction, in a first storage device;
    sequentially moving and setting a matching pattern in the image data, wherein a length of the main scan direction of the matching pattern region is longer than a length of the sub scanning direction of the matching pattern region,
    transmitting pixel information of the matching pattern region line by line in the main scanning direction, from the first storage device to a second storage device; and
    referencing the pixel information of the matching pattern stored in the second storage device and discriminating whether the matching pattern region is an object region based on the pixel information,
    wherein the transmitted pixel information referenced by a first object discrimination unit, and if the matching pattern is discriminated as an object region by the first object discrimination unit, the pixel information is transmitted from the first storage device to the second storage device to be referenced by a second object discrimination unit.

8. A non-transitory computer-readable storage medium that stores a program for instructing a computer to implement the image processing apparatus method according to claim 7.

9. An image processing method for an image processing apparatus, the method comprising:
    storing image data in order of the image data scanned in a main scanning direction, in a first storage device;
    sequentially moving and setting a matching pattern region in the image data, wherein a pixel number in a projected line when the image data of the matching pattern region is projected along the main scanning direction, is smaller than half of a pixel number of the matching pattern in the sub scanning direction;
    transmitting pixel information of the matching pattern region line by line in the main scanning direction, from the first storage device to a second storage device; and
    referencing the pixel information of the matching pattern stored in the second storage device and discriminating whether the matching pattern region is an object region based on the pixel information,
    wherein the transmitted pixel information is referenced by a first object discrimination unit, and if the matching pattern region is discriminated as an object region by the first object discrimination unit, the pixel information is transmitted from the first storage device to the second storage device to be referenced by a second object discrimination unit.

10. A non-transitory computer-readable storage medium that stores a program for instructing a computer to implement the image processing apparatus method according to claim 9.

* * * * *